July 30, 1957

V. H. EARGLE 2,801,319

CONTROL FOR COOKING APPLIANCES

Filed April 5, 1954

Inventor:
Verde H. Eargle,
by *Frank L. Neuhauser*
His Attorney.

United States Patent Office 2,801,319
Patented July 30, 1957

2,801,319

CONTROL FOR COOKING APPLIANCES

Verde H. Eargle, Stratford, Conn., assignor to General Electric Company, a corporation of New York Application April 5, 1954, Serial No. 420,946

16 Claims. (Cl. 219—37)

My invention relates to electrically heated appliances, such as deep fat fryers, cookers, heaters, roasters, ovens and sandwich or waffle grills, and particularly, to improvements in the temperature control therefor. For simplicity and clarity, the invention will be described as being incorporated in a deep fat fryer, however, it should be clearly understood that it may be incorporated in any electrically heated appliance that includes an electrically heated removable member and a thermal responsive temperature control therefor.

In most available electrically heated cooking appliances, and more specifically deep fat fryers, a casing is provided which houses a cooking well. In many of such appliances, the well is removable to permit well interchangeability and removal of the well for cleaning purposes. There is generally provided between the casing and the removable well, electrically heating elements and a thermal responsive temperature control for controlling the temperature in the well. The control is usually connected to a control knob which is accessible from the exterior of the appliance and which is calibrated to afford some measure of selectivity of the temperature in the cooking well. In order to insure that the control functions efficiently, it is desirable that it be thermally connected with the cooking well. As used herein the term "thermally connected" means having a direct heat path; as applied to the facts at hand, it means that there is contact between the control and the well, either directly or through a good heat conductor. Since the well is removable, this thermal connection cannot be physically permanent. In some available cooking appliances, the desirable detachable thermal connection is achieved by mounting the control on springs which force the control against the well when the well is mounted within the casing. The disadvantage of this arrangement is that during removal and insertion of the well, the control can be damaged due to the fact that a portion of the well must physically contact the control and retract it against the force of its springs. Another disadvantage, and a very serious one from the point of view of safety, is that in most available cookers, no provision is made to prevent removal of the well when it is very hot. This is unsafe from the point of view of the user, who might be burned, and from the point of view of the well itself, for if the well is overheated and it is quickly immersed in cold water, it might be damaged.

It is an object of this invention to provide in an electrically heated appliance having a removable well and a thermal responsive temperature control for controlling the temperature in said well, an arrangement wherein direct thermal contact between the well and the control is achieved during operation of the appliance, i. e., when the appliance is heating, and wherein during insertion and removal of the well, there is not any physical contact between the well and the control.

It is another object of my invention to provide in an electrically heated appliance having a removable well adapted to be heated, an arrangement for preventing removal of said well until it is sufficiently cool so as not to constitute a safety hazard.

It is still another object of my invention to provide in an electrically heated appliance having a removable well and a thermal responsive temperature control for controlling the temperature in said well, an arrangement for insuring thermal contact between the control and the well during operation of the appliance, which insures further that the control will not be in contact with the well during removal or insertion of the well, and which insures still further that the well will not be removed from the casing until it is sufficiently cool so as not to constitute a safety hazard.

Some of the objects of my invention are achieved in one form of my invention by mounting the control out of contact with said well and providing a resilient thermal responsive element between the control and the well, which is normally out of contact with said well, but which upon being slightly heated deflects into contact with the well. As used herein, normally means when the appliance is unheated. It should be understood that in this and all forms of this invention, the thermal responsive element reacts to a slight increase in temperature to deflect prior to the actuation of the control, for the primary function of the element, in those forms of my invention where it is associated with a control, is to make the control more responsive to temperature changes in the well.

In another form of my invention, some of the objects of this invention are achieved by mounting the control so as to normally be out of contact with the well, and to provide a thermal responsive element which is adapted to deflect upon being heated slightly and force the control against the well.

All of the objects of this invention are achieved by providing a shoulder on the well, mounting the control so as to normally be out of contact with the well and providing a thermal responsive element which is adapted to deflect upon being heated slightly and force the control against said well, in its contacting position, the control being disposed so as to contact the shoulder if removal of the well is attempted.

Other objects, and further details of that which I believe to be novel and my invention will be clear from the following description and claims taken with the accompanying drawings, wherein:

Figure 1:
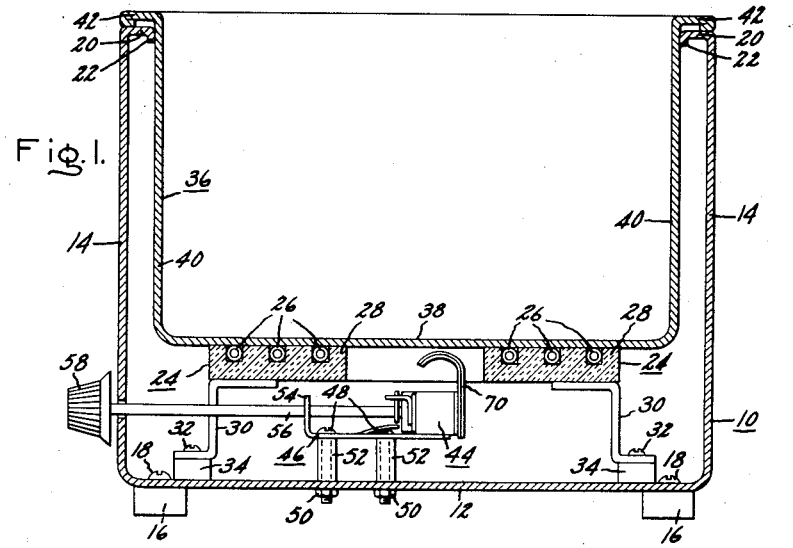
Figure 1 is a sectional view taken in a vertical plane passing through a deep fat fryer.

Referring to the drawings, and particularly to Figure 1 which illustrates one form of my invention incorporated in a deep fat fryer, it will be seen that the fryer generally comprises outer casing 10 having a bottom wall 12 and side wall 14. Casing 10 may have any reasonable shape, it only being necessary that it be hollow and relatively deep. Heat insulating and supporting legs 16 are secured to the bottom wall 12 for conventional purposes. The manner of attaching legs 16 is not relevant to this invention, it being shown as comprising headed fasteners 18 which pass through the bottom wall 12 and are received in the legs 16. The upper portion of side wall 14 is flanged inwardly, and in turn downwardly directed at its periphery 22, for the purpose of providing a smooth seating surface 20 for a cooking well to be described.

Conventional heating element 24, which comprises heating coils 26 housed in insulation material 28, is mounted on brackets 30. The brackets are in turn secured to the inside surface of bottom wall 12 by securing means 32, which are secured in blocks 34 that are fixed to the bottom wall 12. Neither the heating element 24 nor its supporting structure forms a specific part of my invention and, therefore, these parts will not be described in any greater detail.

Cooking well 36, which is generally similar in shape to casing 10, is adapted to be mounted within the casing. Well 36 has a bottom wall 38, which is adapted to be positioned adjacent to the heating element 24 when the well is mounted in the casing, and side wall 40, the upper portion of which is formed in an outwardly directed flange 42. As will be observed from Figure 1, when the well 40 is assembled within the casing 10, its bottom wall 38 rests upon the heating element 24 and its flange 42 rests upon the seat 20 formed on the casing. When assembled, the well and casing provide an air space between them.

Thermal responsive temperature control 44, of the general type disclosed in U. S. Patent 2,316,612 issued to H. L. Newell on April 13, 1943 and assigned to the same assignee as that of this application, is positioned in the air space and secured to the bottom wall 12. Thermal responsive temperature control 44, which for brevity will be hereinafter referred to as "control" 44, forms no specific part of my invention, therefore, it will not be described in detail. In essence, it includes an electrical switch which is actuated by a heat responsive element, usually a bimetallic strip, in response to temperature changes. As those skilled in the art fully understand, the control is designed so as to normally close the electrical circuit through the heating element, and to open the circuit upon the attainment of a predetermined temperature. Control 44 includes a mounting bracket 46, which has its major axis horizontally disposed as shown in Figure 1. Control 44 is disposed in its proper spaced condition relative to the bottom wall 12 by a plurality of conventional threaded securing members 48 and 50 and their associated spacer bushings 52 which mount the bracket 46 in spaced relation to the wall 12 and heating element 28. Bracket 46 has an apertured flange portion 54 which supports control rod 56, which has one of its ends operatively associated with the control 44, and the other of its ends extending through the casing 10 and accessible from the exterior thereof. Control knob 58 is secured to the accessible end of rod 56 and constitutes a conventional temperature selector.

Figure 4:
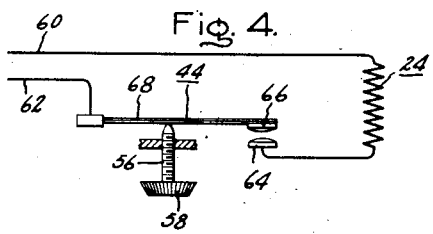
Figure 4 is a wiring diagram showing the electrical circuit which is employed in all forms of my invention.

The structure described thus far is wired as shown in Figure 4, where it will be seen that the electrical power lines 60 and 62, which emanate from a source of electrical power, are connected in the following manner: Line 60 is secured to the heater element 24, shown schematically, which in turn is connected to stationary contact 64, which is part of the switch in control 44; the other control switch contact 66 is formed on the free movable end of the heat responsive element 68 in the control, such as a conventional bimetallic strip, which has its other end fixed to the control housing and connected to line 62. The temperature at which the contacts 64 and 66 make and break contact is governed by the control rod 56, which contacts the heat responsive element 68 and influences its movement.

All of the foregoing structure is conventional and operates in the following manner: Upon plugging the power lines 60 and 62 into a source of electrical power, such as a common household receptacle, the current flows through the heating element causing it to heat. The control 44 is designed to have its contacts 64 and 66 closed prior to reaching a predetermined temperature, which may be selected by utilizing the control knob 58 in a conventional manner. Upon reaching a prescribed temperature, the heat responsive element 68 deflects and causes the contact 66 to break contact with the contact 64, and thereby interrupt the circuit. The control 44 actually cycles between open and closed conditions to maintain the desired temperature in a known manner. It should be understood that as a practical matter, prior to energizing the circuit, a substance, such as fat, oil or shortening, in which food is to be cooked, is placed in the well 36. From the foregoing it will be observed that by setting the control knob 58 at the desired temperature, the substance in the well will be automatically maintained at such temperature. In order to insure accurate temperature control, it is necessary that the control 44 be thermally connected with the well 36.

As was mentioned in the introduction to this patent specification, an attempted solution of this problem of providing thermal contact has been to mount control 44 resiliently so as to be urged in an upward direction so that upon insertion of the well 36 into the casing 10, the bottom wall 38 of the well contacts the control 44, retracts it and maintains it under pressure after the well is fully assembled. In this manner, the control physically contacts the bottom wall 38 of the wall and, therefore, is thermally connected with it. As was previously indicated, the shortcoming of this arrangement is that the frequent making and breaking of contact between the bottom wall 38 of the well and the control 44 might damage the control element and, additionally, the control is inclined to get in the way when the well is inserted or removed.

In one form of my invention, shown in Figure 1, I eliminate the shortcomings of the prior attempts at solving this problem, by mounting the control 44 clearly out of contact with the well 36 at all times, and securing resilient thermal responsive element 70, which may be of the well-known bimetallic strip variety, to said control. Element 70 has one of its ends secured to the control 44, and normally has its free end adjacent to, but out of contact with well 36. It should be noted that, as illustrated, the free end of element 70 is curved and received in a cavity which is formed by the heating element 24 and the bottom wall 38 of the well 36. Upon energization of the electrical circuit, the heat generated by the heating element 24 warms the air in the cavity and causes the curved end of element 70 to quickly deflect toward well 36 and make physical contact with the under side of the bottom wall 38 of said well. Physical contact is made shortly after the circuit is energized for the element 70 reacts quickly to temperature changes, and thereafter a direct heat path is effected between the well 36 and the control 44 enabling said control to operate most effectively.

It should be apparent from the foregoing description that element 70, which insures the desired heat path, in no way interferes with the insertion or removal of the well 36 and consequently that there is little possibility of its being damaged. This obtains due to the fact that normally element 70 assumes the curved position shown in Figure 1, wherein it is out of contact with well 36 and, therefore, does not even contact well 36 when said well is inserted into the casing 10. After being heated, upon removal of the well, the element 70 cannot be damaged for it is softly pressing against well 36 or in the state of retracting due to cooling. Regardless of whether or not the casing is cooled to the point whereby the free end of element 70 has assumed the fully curved condition shown in Figure 1, it is virtually impossible to damage the element 70 by removal of the well.

Figure 2:
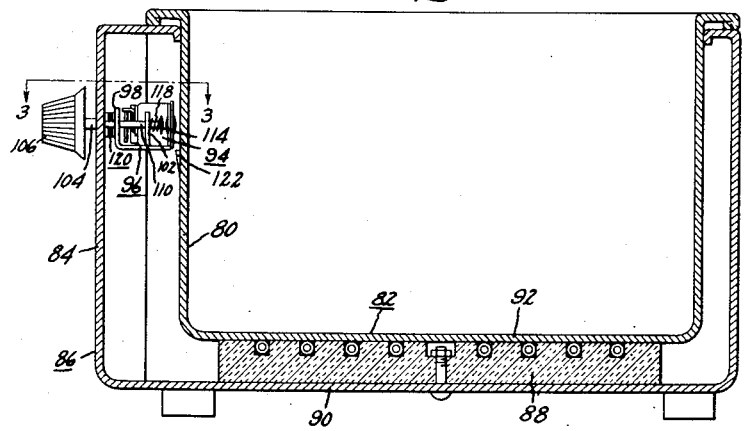
Figure 2 is a sectional view taken in a vertical plane passing through another form of a deep fat fryer.
Figure 3:
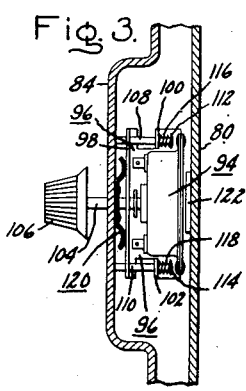
Figure 3 is a sectional view taken on line 3—3 of Figure 2, with portions broken away.

In Figures 2 and 3, I have illustrated another form of my invention in which the control 94 is mounted in the space between side wall 80 of the removable well 82 and side wall 84 of the casing 86. The construction and operation of the deep fat fryer illustrated in Figures 2 and 3, other than that of my novel control and safety locking mechanism to be described, is substantially the same as that described for the form of my invention shown in Figure 1. In short, the removable well 80 is adapted to be heated by a conventional heating element 88, which is shown as being secured to bottom wall 90 of the casing 86 and adapted to contact the bottom wall 92 of the well 82.

Control 94, is similar to control 44 in the modification shown in Figure 1, but is mounted differently, and does not have a thermal responsive element between it and the well 80 as is the case in the Figure 1 modification. Control 94 is secured to a mounting bracket 96 in a conventional manner. Bracket 96 has an upturned flange 98 formed at one end, and tabs 100 and 102 formed on opposite sides thereof parallel to and spaced inwardly of said flange. From Figure 3 it will be seen that control rod 104, which is operatively connected to control 94 in a conventional manner, passes through undesignated openings in the flange 98 and side wall 84 of the casing to the exterior of the appliance, and has a control knob 106 secured to its outermost end. Secured to the inside of wall 84 is a pair of parallel guide rods 108 and 110. Rod 108 is received in aligned undesignated openings in the flange 98 and the tab 100; rod 110 is received in aligned undesignated openings in the flange 98 and tab 102. The free ends of the guides 108 and 110 have heads 112 and 114, respectively, formed thereon. Coil spring 116 surrounds a portion of the guide rod 108 and is positioned between the tab 100 and the head 112; coil spring 118 surrounds a portion of the guide rod 110 and is positioned between the tab 102 and the head 114.

Secured to the inner face of side wall 84 of the casing by undesignated securing means, such as rivets or the like, is a thermal responsive element 120. As can best be seen in Figure 3, element 120 comprises a strip, which may be a bimetallic strip, which has its end portions free and its central portion rigidly secured to the wall 84. The end portions of element 120 are adapted to contact one side of the flange 98 of the bracket 96. In the position shown in Figures 2 and 3, the element 120 is substantially cool, and as will be observed, particularly from Figure 2, the innermost edge of the control 94 projects to a point near but spaced from the side wall 80 of the well 82. When the well is mounted in the casing and the circuit energized, the heating element 90 heats the material in the well 80 and also heats the air in the space between the well 82 and the casing 86. This causes the end portions of the element 120, which is extremely sensitive to temperature changes, to quickly deflect away from the wall 84 and to exert force on the flange 98, ultimately causing the bracket 96 and control 94 to move together toward the well (to the right as shown in the drawings) until the control contacts the wall 80 of the well. When this occurs, a direct heat path is provided between the well 82 and the control 94, thereby insuring efficient operation of the control.

In the form of my invention shown in Figures 2 and 3, a safety feature may be produced by providing a projection, such as lug 122, on the side of wall 80 facing control 94 in the vicinity of said control and uniquely disposing the control 94 and element 120. This is accomplished by designing element 120 in accordance with well known principles for thermal responsive elements, and positioning control 94, so that when the appliance is cool, lug 122 clears the control 94 upon withdrawal of the well out of the casing, and when the appliance is hot, control 94 has been moved near or in contact with the wall 80 and has portions directly above the lug 122. These portions prevent removal of the well out of the casing, and thereby eliminate any possibility of the well 82 being removed while it is hot, for lug 122 will not clear the control 94 until the temperature in the vicinity of element 120 subsides to the point whereby the deflected ends of element 120 begin to straighten, and the springs 116 and 118 are strong enough to overcome the force of said ends and move the control 94 and its bracket 96 toward casing 86 (to the left as shown in the drawings).

The safety feature alone can be achieved, if it alone is desired, without regard to controlling the temperature in the well, if in the modification shown in Figures 2 and 3, the control 94 is mounted so as to extend short of the well, but far enough to interfere with the vertical movement of lug 122. If temperature control is not needed, the control 94 could be eliminated and bracket 96 or some other object could constitute the dogging member; in this event the thermal responsive element would be selected and designed to deflect away from dogging position at a safe temperature. While it is unlikely that the well temperature control would not be wanted, the purpose of this paragraph is to point out that the safety feature can be isolated and utilized by itself.

From the detailed disclosure set forth, it should be apparent that I have provided an invention which satisfies each of the objects of this invention, in that two improved alternate well temperature controls have been provided (the heat path arrangements shown in Figure 1 and Figures 2 and 3), an improved safety lock for a cooking appliance has been provided (the locking arrangement per se shown in Figures 2 and 3) and a combination improved well temperature control and safety lock has been provided (the complete modification shown in Figures 2 and 3).

As will be evident from the foregoing description, certain aspects of my invention are not limited to the particular details of construction of the examples illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. In a cooking device having a casing, a well removably mounted in said casing, a space between said casing and said well, electrical heating means in said space, a thermal responsive control for said means in said space, said control and said means being connected electrically and being adapted to be energized, said control having a thermal responsive switch that is adapted to open and close in response to temperature changes, that improvement comprising a thermal responsive element mounted in said space exteriorly of said control, said element being responsive to a slight temperature increase in said space whereby it will shortly after said heating means is energized at the beginning of a cooking operation deflect and thereby cause said control to be thermally connected to said well.

2. A device as defined in claim 1 wherein said element has portions located between said control and said well.

3. A device as defined in claim 2 wherein said control is stationary relative to said casing, said element is secured to said control and normally out of contact with said well, said element being adapted to move into contact with said well when it is deflected.

4. A device as defined in claim 3 wherein said element is a bimetallic strip that is secured at one of its ends to said control and which has a free end that normally is out of contact with said well but which is adapted to contact said well upon deflection of said element.

5. A device as defined in claim 4 wherein said free end is normally curved and located adjacent to said heating means.

6. A device as defined in claim 5 wherein said heating means provide a cavity in which said free end is disposed.

7. A device as defined in claim 6 wherein said control and said elment are located below said well.

8. A device as defined in claim 1 wherein said element is located between said control and said casing.

9. A device as defined in claim 1 wherein said control is movably mounted and adapted to be moved into contact with said well upon deflection of said element.

10. A device as defined in claim 9 wherein said element is secured to said casing and is adapted to force said control into contact with said well upon deflection of said element.

11. A device as defined in claim 10 wherein said control is secured to a bracket, said bracket is slidable on guides toward and away from said well, said element contacts said bracket, resilient means are provided and normally urge said bracket away from said well, and said element is adapted to overpower said resilient means and move said bracket toward said well and force said control into contact with said well upon deflection of said element.

12. A device as defined in claim 11 wherein said guides comprise a plurality of rods that are secured to said casing and have enlarged heads at their free ends, said bracket has a plurality of portions having openings that receive said rods, and said resilient means are located between said heads and the portions nearest to said heads.

13. A device as defined in claim 1 wherein said control is movably mounted and adapted to be moved into contact with said well by deflection of said element, a lug is secured to said well in the vicinity of said control and extends toward said control to a point where it will clear said control upon removal of said well when said element is not deflected, but which will contact and have further movement precluded by said control upon attempted removal of said well when said element is deflected.

14. A cooking device comprising a cup-shaped casing, a cup-shaped well removably mounted in said casing and adapted to cooperate with said casing when mounted therein to provide a space between the side walls of the parts, a lug secured to the side wall of said well and projecting into said space, electrical heating means, a thermal responsive control for said means, said control being movably mounted in said space above said lug, said control normally extending toward said well to a point short of said well and short of path described by said lug when said well is removed from said casing, said control being adapted to move toward said well at least to a point where it intersects said path, a thermal responsive element being sensitive to slight temperature changes in said space and adapted to respond thereto by deflecting, said element being associated with said control in such a manner as to move said control upon deflecting.

15. A device as defined in claim 14 wherein said control unit is adapted to move into contact with said well.

16. In a cooking device comprising a casing, a well removably mounted in said casing and cooperating therewith to form a space between the side walls of the parts, a lug secured to the side wall of said well and projecting into said space, a thermal responsive element having a portion above said lug, said portion normally extending toward said well to a point short of the path described by said lug when the well is removed from the casing, said element being adapted to deflect in response to a temperature increase to a point where said portion intersects said path.

References Cited in the file of this patent

UNITED STATES PATENTS

| | | |
|---|---|---|
| 2,215,929 | Husk | Sept. 24, 1940 |
| 2,511,643 | Lawrence | June 13, 1950 |
| 2,528,579 | Clark | Nov. 7, 1950 |
| 2,593,392 | Budlane et al. | Apr. 15, 1952 |
| 2,660,658 | Wagner et al. | Nov. 24, 1953 |
| 2,682,602 | Huck | June 29, 1954 |
| 2,699,489 | Gorham | Jan. 11, 1955 |